(12) United States Patent
Sundstrom et al.

(10) Patent No.: US 11,190,294 B2
(45) Date of Patent: Nov. 30, 2021

(54) CONDITIONAL DATA TRANSMISSION BASED ON THE QUALITY OF THE RADIO CHANNEL

(71) Applicant: Sony Mobile Communications Inc., Tokyo (JP)

(72) Inventors: Henrik Sundstrom, Sodra Sandby (SE); Eduard Popkov, Lund (SE); Vanja Plicanic Samuelsson, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 404 days.

(21) Appl. No.: 16/305,912

(22) PCT Filed: May 30, 2016

(86) PCT No.: PCT/EP2016/062110
§ 371 (c)(1),
(2) Date: Nov. 30, 2018

(87) PCT Pub. No.: WO2017/207014
PCT Pub. Date: Dec. 7, 2017

(65) Prior Publication Data
US 2020/0328837 A1    Oct. 15, 2020

(51) Int. Cl.
*H04L 1/00* (2006.01)
*H04W 76/30* (2018.01)
(Continued)

(52) U.S. Cl.
CPC .......... *H04L 1/0001* (2013.01); *H04W 24/08* (2013.01); *H04W 68/02* (2013.01); *H04W 74/08* (2013.01); *H04W 76/10* (2018.02); *H04W 76/30* (2018.02)

(58) Field of Classification Search
CPC .... H04L 1/0001; H04W 76/30; H04W 76/10; H04W 24/08; H04W 68/02; H04W 74/08; H04W 4/20
See application file for complete search history.

(56) References Cited

U.S. PATENT DOCUMENTS

2012/0164954 A1* 6/2012 Karampatsis ........... H04W 8/02
455/67.11
2014/0321371 A1* 10/2014 Anderson ............. H04W 76/38
370/329
(Continued)

FOREIGN PATENT DOCUMENTS

JP     2000278747 A    10/2000
JP     2001086545 A     3/2001
(Continued)

OTHER PUBLICATIONS

International Search Report and Written Opinion from counterpart International Patent Application No. PCT/EP2016/062110 dated Feb. 8, 2017, 12 pages.

(Continued)

*Primary Examiner* — Ayaz R Sheikh
*Assistant Examiner* — Louis Samara
(74) *Attorney, Agent, or Firm* — Tucker Ellis LLP

(57) ABSTRACT

A radio device (100) detects a trigger event, which may for example correspond to receiving a paging message (401). In response to the trigger event, the radio device (100) monitors radio channel quality experienced by the radio device (100). In response to a condition based on the monitored radio channel quality channel being met, the radio device triggers a data transfer with the cellular network.

12 Claims, 8 Drawing Sheets

(51) Int. Cl.
*H04W 76/10* (2018.01)
*H04W 24/08* (2009.01)
*H04W 68/02* (2009.01)
*H04W 74/08* (2009.01)

(56) References Cited

U.S. PATENT DOCUMENTS

2015/0009815 A1* 1/2015 Hsu .................. H04L 47/14
370/230.1
2015/0382320 A1* 12/2015 Rune ................. H04W 4/20
455/426.1
2016/0088462 A1* 3/2016 Jin .................... H04W 8/065
455/456.5
2020/0154395 A1* 5/2020 Bienas ............... H04W 68/02

FOREIGN PATENT DOCUMENTS

| | | |
|---|---|---|
| JP | 2003258705 A | 9/2003 |
| JP | 2009189024 A | 8/2009 |
| JP | 2010081447 A | 4/2010 |
| JP | 2010219658 A | 9/2010 |
| JP | 2013009088 A | 1/2013 |
| JP | 2015073336 A | 4/2015 |
| WO | 2008013246 A | 12/2009 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP Standard; 3GPP TS 36.331, vol. RAN WG2, No. V13.0.0, Jan. 6, 2016.

* cited by examiner

CONDITIONAL DATA TRANSMISSION BASED ON THE QUALITY OF THE RADIO CHANNEL

FIELD OF THE INVENTION

The present invention relates to methods of controlling radio transmission in a cellular network and to corresponding devices.

BACKGROUND OF THE INVENTION

In cellular networks, such as a cellular network based on the LTE (Long Term Evolution) radio technology specified by 3GPP ($3^{rd}$ Generation Partnership Project), radio devices (also referred to as user equipment or "UE") may enter an idle mode in which the UE does not maintain a data connection to the cellular network, but may be contacted by the cellular network through a paging procedure. The paging procedure of the LTE radio technology is for example specified in 3GPP TS 36.331 V13.1.0 (2016-03). In response to receiving a paging message, the UE may initiate connection establishment, so that data can be received from the cellular network and/or data can be transmitted to the cellular network. This may also be regarded as downlink initiated traffic. Further, the UE itself could initiate connection establishment, e.g., in response to locally detecting a need to transmit or receive data. This may also be regarded as uplink initiated traffic.

One aspect of the LTE radio technology specifically addresses Machine Type Communications (MTC) and a corresponding class of UEs, referred to as MTC device, as well as specific features to support efficient MTC, have been defined on both the network side and the UE side. Specific variants of MTC are referred to as IoT (Internet of Things) and NB-IoT (Narrowband IoT).

MTC or IoT devices may be utilized in many different ways, and one way of classifying the different use cases and device classes is to distinguish between uplink initiated traffic and downlink initiated traffic. For example, some MTC devices may primarily generate uplink initiated traffic, while others may primarily generated downlink initiated traffic.

The MTC and IoT technologies allows for a wide range of radio link scenarios. In some cases, very large path losses can be allowed, i.e., a connection can be established under very poor radio channel conditions. For example, in some cases the NB-IoT technology specified by 3GPP may allow a path loss corresponding to up to 20 dB coverage extension as compared to legacy 3G and 4G technologies such as UMTS (Universal Mobile Telecommunications System) or LTE.

However, the coverage extension of MTC and NB-IoT is based on transmission repetitions and utilization of robust modulation and coding schemes, which typically results in low effective data rate. As compared to communication under favorable channel conditions without coverage extension where no or at least very few transmission repetitions are required and high order modulation can be used, this typically has the effect of a significantly higher utilization of resources from the network perspective. Further, there may also be higher energy consumption on the UE side since the achievable ratio of transmitted bits per consumed power unit will be small in case of a low effective data rate. Accordingly, utilization of the coverage extension mode, or at least the very largest amount of repetition levels for coverage extension should be avoided as much as possible.

For uplink initiated traffic, avoidance of utilizing the coverage extension mode could be implemented by configuring corresponding rules based on radio channel measurements. In this way, a UE which experiences poor radio channel conditions may decide to refrain from establishing a connection.

However, in the case of downlink initiated traffic implementation of a mechanism to avoid utilization of the coverage extension mode is not straightforward to implement, because when the network initiates connection establishment for a UE in idle mode, the network will typically not be aware of the radio channel conditions for the communication link to be established between the network and the UE.

Accordingly, there is a need for techniques that allow for efficiently controlling downlink initiated traffic.

SUMMARY OF THE INVENTION

According to an embodiment, a method of controlling radio transmission in a cellular network is provided. According to the method, a radio device detects a trigger event. In response to the trigger event, the radio device monitors radio channel quality experienced by the radio device. In response to a condition based on the monitored radio channel quality being met, the radio device triggers a data transfer with the cellular network. This condition may involve that the radio channel quality exceeds a threshold.

According to an embodiment, the trigger event comprises reception of a paging message. In this case, the radio device may further receive an indication causing the radio device to perform the monitoring of the radio channel quality in response to reception of the paging message. The indication may be transmitted with the paging message, e.g., as part of the paging message. Further, the indication may be transmitted by selecting a corresponding channel for sending the paging message.

According to an embodiment, the paging message causes the radio device to establish a connection to the cellular network. The indication may then comprise a message causing the radio device to release the connection, e.g., a connection release command which further causes the radio device to perform the monitoring after releasing the connection.

According to an embodiment, the trigger event comprises a trigger condition for a location update of the radio device. An example of such a location update is a Tracking Area Update (TAU) procedure as defined in the LTE radio technology. In this case, the radio device may trigger the data transfer by sending a location update message to the cellular network, e.g., a TAU message.

According to an embodiment, the condition is further based on expiry of a timer started by the radio device when detecting the trigger event. In particular, the radio device may trigger the data transfer when the timer expires, irrespective of the monitored radio channel quality.

According to a further embodiment, a method of controlling radio transmission in a cellular network is provided. According to the method, a base station of the cellular network sends a paging message to a radio device. Further, the base station sends an indication to the radio device. The indication causes the radio device to, in response to reception of the paging message, monitor radio channel quality experienced by the radio device and trigger a data transfer with the cellular network in response to a condition based on the monitored radio channel quality being met. The indication may be transmitted with the paging message. Further, the paging message may cause the radio device to establish a connection to the cellular network, and the indication may comprise a message causing the radio device to release the connection, e.g., a connection release command which further causes the radio device to perform the monitoring after releasing the connection.

According to an embodiment, the base station monitors radio channel quality experienced in communication between the base station and the radio device. This can be accomplished while the connection is established and the radio device transmits signals to the base station. The, base station may then send the indication depending on the radio channel conditions monitored by the base station. In particular, the base station may send the indication when the radio channel quality monitored by the base station is below a threshold.

According to an embodiment, the condition is further based on expiry of a timer started by the radio device when detecting the trigger event.

According to a further embodiment, a radio device is provided. The radio device comprises a radio interface for connecting to a cellular network. Further, the radio device comprises one or more processors configured to:
 detect a trigger event; in response to the trigger event, monitor radio channel quality experienced by the radio device; and
 in response to a condition based on the monitored radio channel quality being met, trigger a data transfer with the cellular network.

In particular, the at least one processor of the radio device may be configured to perform the steps as performed by radio device in the above-mentioned method.

According to a further embodiment, a base station for a cellular network is provided. The base station comprises a radio interface to a radio device. Further, the base station comprises one or more processors configured to:
 send a paging message to the radio device; and
 send an indication to the radio device, the indication causing the radio device to, in response to reception of the paging message, monitor radio channel quality experienced by the radio device and trigger a data transfer with the cellular network in response to a condition based on the monitored radio channel quality being met.

In particular, the at least one processor of the base station may be configured to perform the steps as performed by the base station in the above-mentioned method.

The above and further embodiments of the invention will now be described in more detail with reference to the accompanying drawings.

DETAILED DESCRIPTION OF EMBODIMENTS

Figure 1:
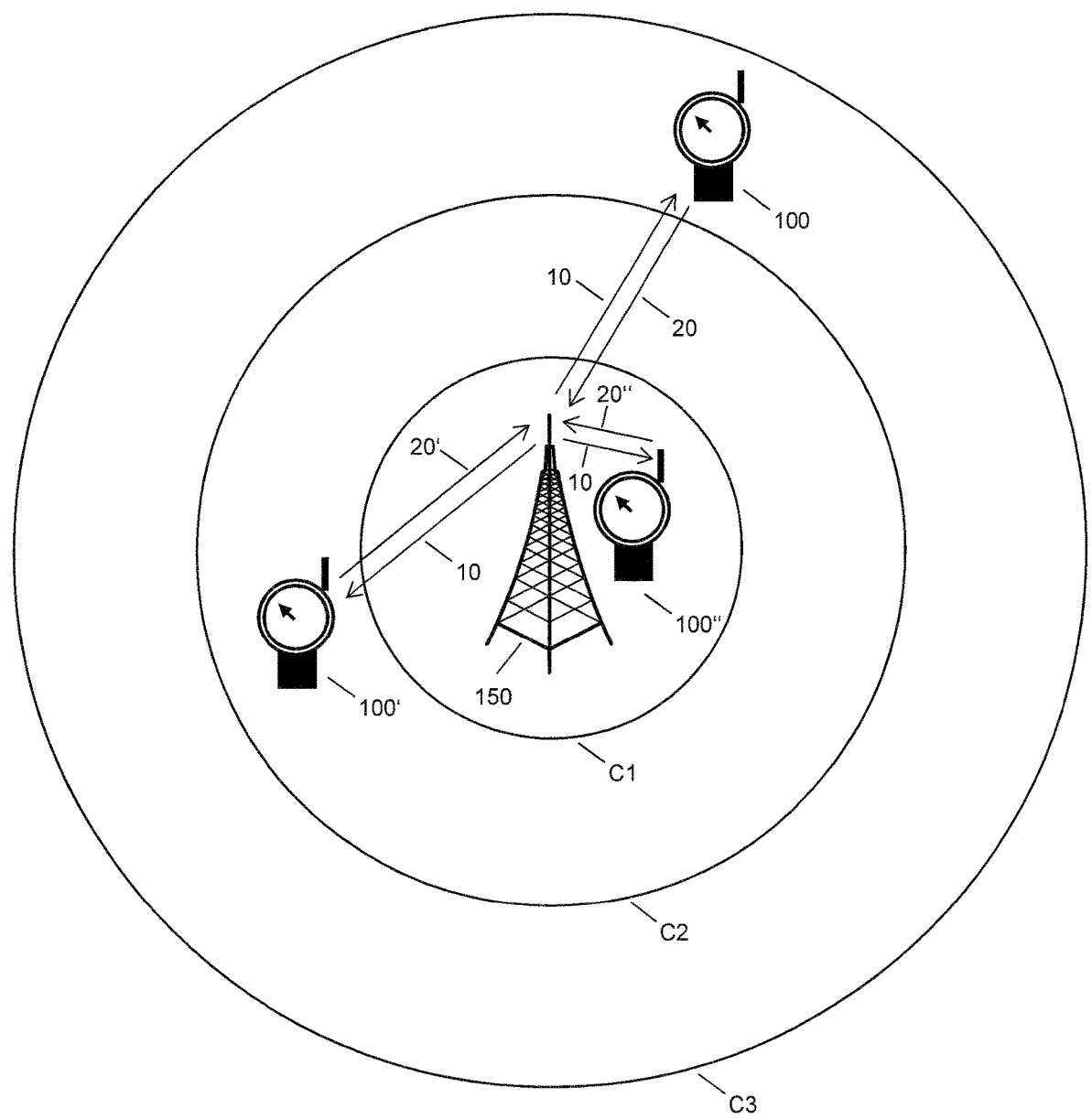
FIG. 1 schematically illustrates a cellular network system according to an embodiment of the invention.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to conditional initiation of data transfers between a radio device and a cellular network. In the examples as illustrated in the following, the radio device will also be referred to as a UE. According to the illustrated embodiments, rather than immediately triggering a data transfer (typically a transfer of user plane traffic) in response to a trigger event, the radio device first monitors radio channel quality experienced by the radio device and triggers the data transfer when a condition based on the monitored channel quality is met, e.g., if the monitored channel quality is sufficiently good. The radio channel quality being sufficiently good can for example be assessed in terms of comparing the monitored radio channel quality to a threshold and/or checking if the monitored radio channel quality would require a specific transmission mode adapted to poor radio channel conditions, such as using a certain modulation format, repetitive transmissions, or the coverage extension mode specified for, e.g., MTC and NB-IoT.

The trigger event may be reception of a paging message by the radio device, which would normally cause the radio device to establish a connection to the cellular network (e.g., by performing a random access procedure), so that the radio device transitions from idle mode to connected mode and can then receive data from the cellular network (on a downlink data channel such as a PDSCH or NB-PDSCH) and/or send data to the cellular network (on an uplink data channel such as a PUSCH or NB-PUSCH). In some of the illustrated embodiments, before establishing the connection, the radio device monitors the radio channel quality and waits with the establishment of the connection until the radio channel quality is sufficiently good so that resource consuming transmission modes, such as the above-mentioned coverage extension mode, can be avoided.

In further examples, the trigger condition may also correspond to a trigger condition for triggering a location update by the radio device, such as a TAU as defined in the LTE technology. In the LTE technology, TAU occasions may be used by the network for sending downlink data to the radio. In some of the embodiments as described herein, before establishing the connection, the radio device monitors the radio channel quality and waits with sending of a TAU message or similar location update message until the radio channel quality is sufficiently good so that resource consuming transmission modes, such as the above-mentioned coverage extension mode, can be avoided.

The condition may also be based on expiry of a timer started when detecting the trigger event. In particular, the timer can be used to trigger the data transfer irrespective of the monitored channel conditions. In this way it can be achieved that the data transfer is not suppressed entirely if the radio channel quality is poor, but only delayed.

Accordingly, in embodiments as illustrated herein the radio device may postpone a data transfer initiated by the cellular network (e.g., by paging or at a TAU occasion) until radio channel quality improves.

In the embodiments as illustrated in more detail the following, it is assumed that the UE is an MTC device operated in a cellular network based on the LTE radio technology, in particular the UE may be an NB-IoT radio device. However, it is to be understood that the illustrated concepts could also be applied in connection with other types of UEs and/or radio technologies.

FIG. 1 schematically illustrates a cellular network system according to an embodiment. Specifically, FIG. 1 shows MTC radio devices 100, 100', 100" and a base station 150, in accordance with the assumed utilization of the LTE radio technology in the following also referred to as eNB. The MTC device 100 is assumed to be an NB-IoT radio device. As illustrated, a cell served by the base station 150 may provide different coverage ranges C1, C2, C3. In the illustrated scenario, the coverage range C1 is assumed to correspond to normal coverage, the coverage range C2 is assumed to correspond to extended coverage, and the coverage range C3 is assumed to correspond to extreme coverage as supported by NB-IoT. The extreme coverage may be achieved by using a robust modulation and coding scheme and repetitive transmissions. However, this may limit the achievable data rate, e.g., to values as low as 300 bps. Further, the high number of repetitions may result in increased utilization of network resources (e.g., radio resources which are allocated to the repetitive transmissions) and increased energy consumption of the radio device (as compared to the coverage ranges C1 and C2).

The MTC devices 100, 100', 100" each may receive downlink signals from the eNB 150. These downlink signals may for example include a paging channel (PCH) conveying paging messages to the MTC devices 100, 100', 100". In response to receiving a paging message, the MTC devices 100, 100', 100" can access the cell of the eNB 150 and establish a data connection, so that downlink data 10 can be sent in a downlink direction from the network to the MTC device 100, 100', 100", e.g., on a PDSCH (Physical Downlink Shared Channel) or NB-PDSCH, and/or uplink data 20 can be sent in an uplink direction from the MTC device 100, 100', 100" to the network, e.g., on a PUSCH (Physical Uplink Shared Channel) or NB-PUSCH.

Figure 2:
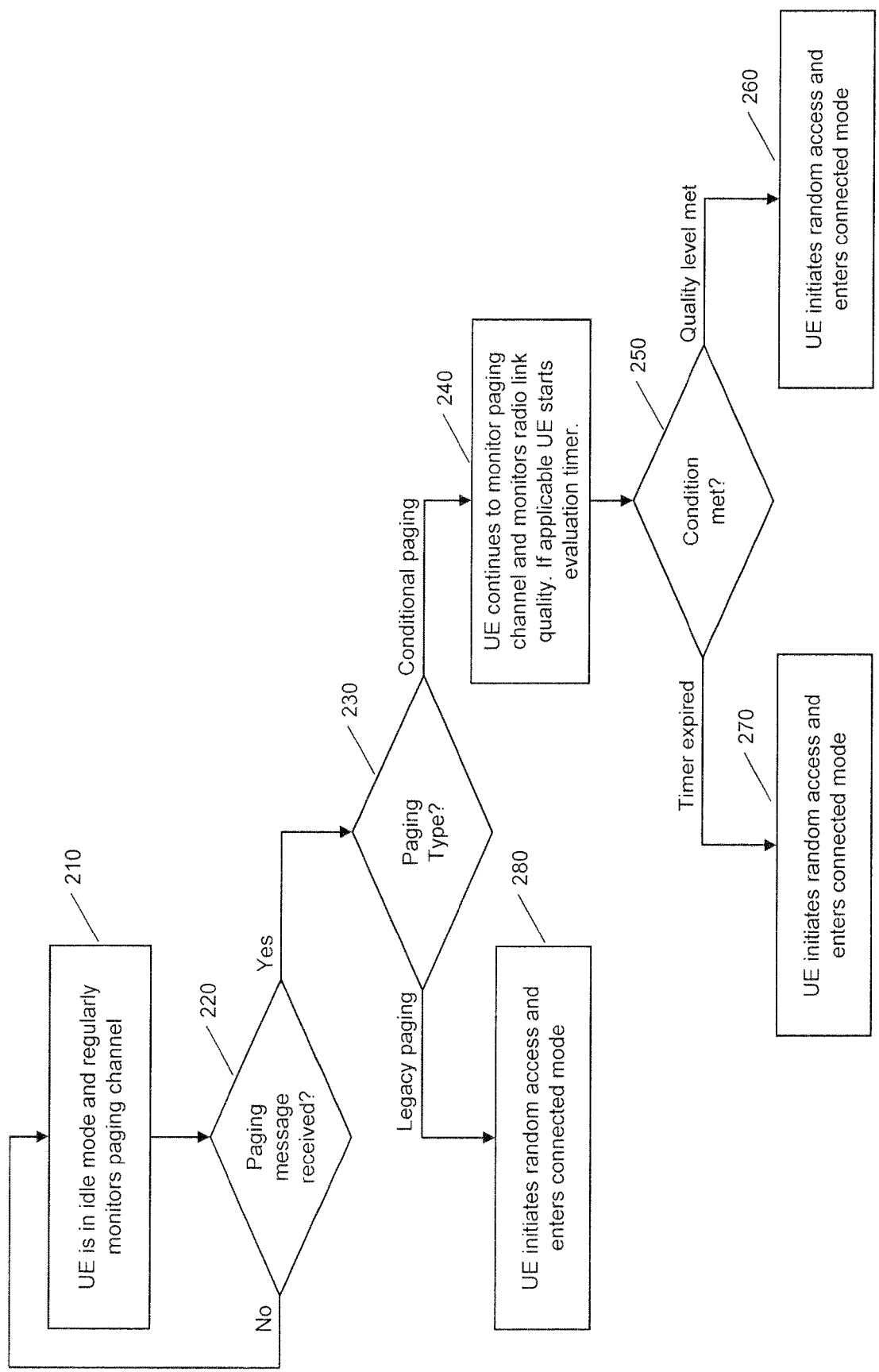
FIG. 2 shows a flowchart for illustrating a network initiated connection establishment procedure according to an embodiment of the invention.

In order to avoid utilization of the extended coverage mode as far as possible, one option is to define a dedicated paging message which operates in the conditional manner as outlined above. A corresponding example of procedures for downlink initiated traffic is illustrated by FIG. 2. The example of FIG. 2 assumes that at least two different types of paging messages are defined, namely a legacy paging message (as for example defined in 36.331 V13.1.0) and a conditional paging message. The conditional paging message may be similar to the legacy paging message, but additionally indicate that upon reception of the conditional paging message the UE shall first monitor radio channel quality experienced by the UE before proceeding to a data transfer. The legacy paging message and the conditional paging message may be distinguished from each other by a corresponding indication within the paging message (such as one or more indicator bits or some other indicator field) or by defining corresponding paging channels, e.g., the PCH for the legacy paging message and a C-PDCH (" "Conditional Paging Channel") for the conditional paging message. The PCH and the C-PCH may for example use different frequency resources, different time resources, and/or different coding.

In the procedures of FIG. 2 the UE (e.g., the MTC device 100 of FIG. 1) is assumed to be in idle mode and regularly monitor the paging channel(s), as illustrated by step 210. This may involve monitoring the PCH. If the above option of using the C-PCH is applied, this may involve monitoring the PCH and the C-PCH.

At step 220, the UE checks if a paging message was received. If this is not the case, the UE stays in idle mode and continues to monitor the paging channel(s), as illustrated by branch "No". If a paging message was received, the UE continues to step 230 to determine the type of paging message. The paging message may be sent by the cellular network to initiate a data transfer to and/or from the UE.

If the paging message corresponds to the conditional paging type, as indicated by branch "Conditional paging", the procedure continues with step 240. At step 240, the UE monitors the radio channel quality experienced by the UE. For example, the UE may monitor reference signals or other signals transmitted by one or more base stations (such as the eNB 150) to determine the radio channel quality, e.g., in terms of an RSSI (Received Signal Strength Indication). Further, the UE may continue to monitor the paging channel(s) and optionally start a timer.

At step 250, the UE checks whether a condition based on the monitored radio channel quality is met. In the illustrated example, this condition is assumed to be met when the radio channel quality monitored at step 240 meets a certain quality level, e.g., defined in terms of a minimum threshold for the RSSI. Further, when using the option of starting the timer at step 240, the condition may be met when the timer expires, irrespective of the monitored channel conditions. It is noted that other definitions of the condition to be met are possible, e.g., conditions considering further criteria such as mobility of the UE. For example, the condition could be met if the UE is determined to substantially stationary, which means that typically no big changes in the radio channel conditions can be expected.

If at step 250 it is found that the monitored radio channel conditions meet the specified quality level, the procedure continues with step 260 as indicated by branch "Quality level met". At step 260, the UE initiates a random access procedure and enters connected mode so that downlink data (e.g. user plane data) can be transferred from the network to the UE and/or uplink data (e.g. user plane data) can be transferred from the UE to the network. Similarly, if the timer expires, the procedure continues with step 270, as indicated by branch "Timer expired". At step 270, the UE initiates a random access procedure and enters connected mode so that downlink data can be transferred from the network to the UE and/or uplink data (e.g. user plane data) can be transferred from the UE to the network.

If at step 230 the paging message received by the UE is found to be of the legacy paging type, the procedure continues to step 280, as indicated by branch "Legacy paging". At step 280, the UE initiates a random access procedure and enters connected mode so that downlink data can be transferred from the network to the UE and/or uplink data (e.g. user plane data) can be transferred from the UE to the network.

As can be seen, in the procedures of FIG. 2 the UE may take different ways to enter connected mode. In the case of receiving the legacy paging message the UE may immediately enter connected mode and thereby trigger the data transfer to or from the UE. In the case of receiving the conditional paging message the UE will enter connected mode only if the radio channel conditions are found to meet the specified criteria (e.g., allowing to avoid usage of the extended coverage mode), or if the timer expires. Accordingly, the procedure increases the chances of triggering the data transfer when the radio channel conditions are favorable.

According to a further option, it is not necessary to define a dedicated paging message and for example only the above-mentioned legacy paging message may be utilized for initiating traffic from the network side. Rather, an additional message may be transmitted to the UE to indicate that the UE shall first monitor radio channel quality experienced by the UE before proceeding to a data transfer. An example of corresponding procedures is illustrated in FIG. 3.

Figure 3:
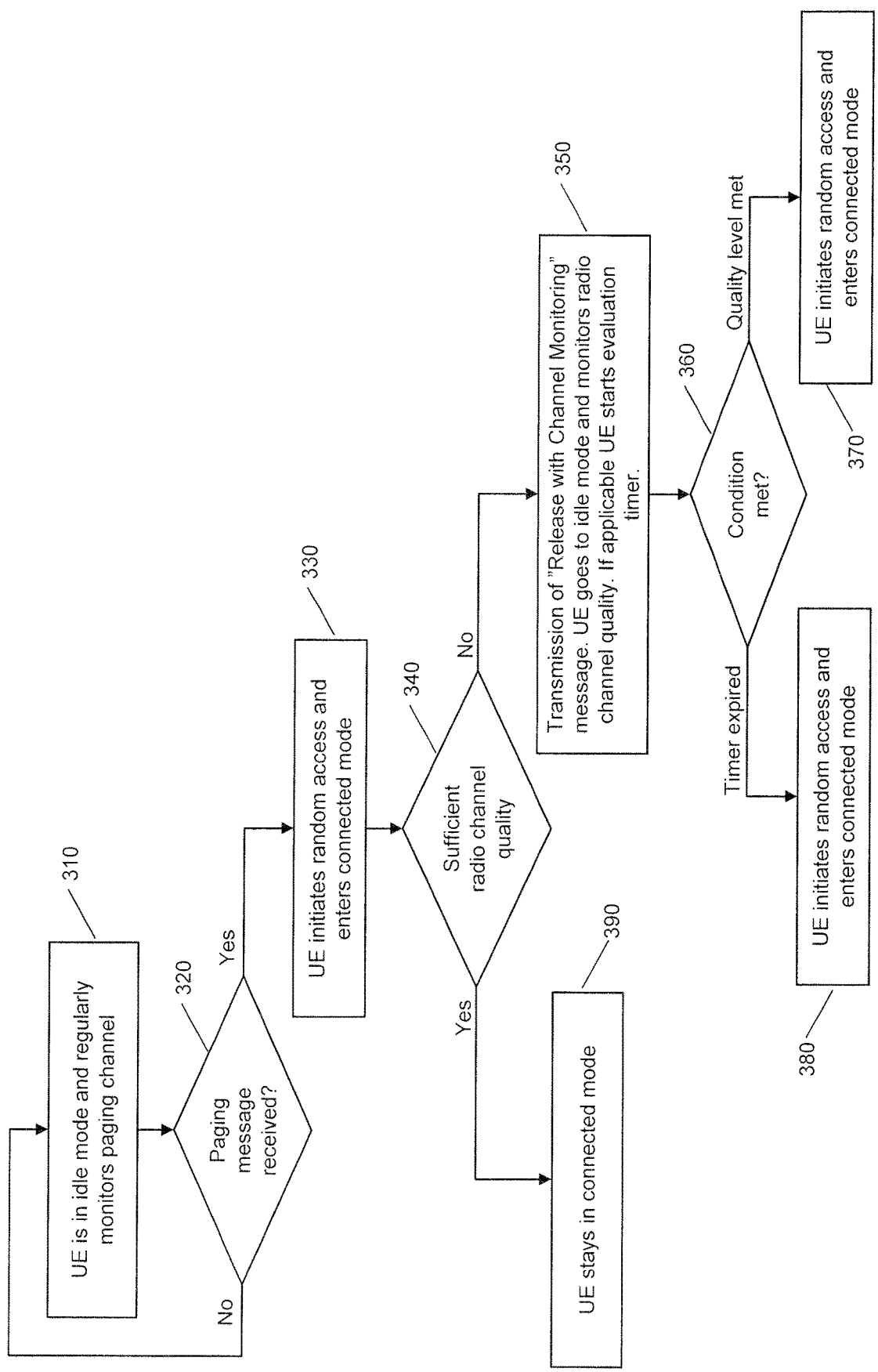
FIG. 3 shows a flowchart for illustrating a further network initiated connection establishment procedure according to an embodiment of the invention.

In the procedures of FIG. 3 the UE (e.g., the MTC device 100 of FIG. 1) is assumed to be in idle mode and regularly monitor the paging channel (e.g., the PCH), as illustrated by step 310.

At step 320, the UE checks if a paging message was received. If this is not the case, the UE stays in idle mode and continues to monitor the paging channel(s), as illustrated by branch "No". If a paging message was received, the UE continues to step 330. At step 330, the UE initiates a random access procedure and enters connected mode. The paging message may be sent by the cellular network to initiate a data transfer to and/or from the UE.

The radio channel quality for the UE is then monitored by a base station of the cellular network (e.g., the eNB 150). Typically this would be the base station which sent the paging message. For example, the base station may monitor pilot signals or other signals transmitted by the UE to determine the radio channel quality, e.g., in terms of an RSSI. In particular, as indicated by step 340, the base station determines whether or not the radio channel quality is sufficient (or meets a certain quality level).

If the base station finds that the radio channel quality is not sufficient, e.g., below a threshold, the procedure continues to step 350, as indicated by branch "No".

At step 350, the base station sends the above-mentioned message to the UE which indicates that the UE shall first monitor radio channel quality experienced by the UE before proceeding to a data transfer. More specifically, this message instructs the UE to go back to idle mode and monitor the radio channel quality experienced by the UE in idle mode. This message may for example be referred to as "Release with Channel Monitoring" message. This message may for example be defined as an additional RRC message or as a subtype of an existing RRC message for releasing the connection.

In response to receiving the message, the UE goes back to idle mode and monitors the radio channel quality experienced by the UE. For example, the UE may monitor reference signals or other signals transmitted by the base station to determine the radio channel quality, e.g., in terms of an RSSI. Further, the UE may continue to monitor the paging channel(s) and optionally start a timer.

At step 360, the UE checks whether a condition based on the monitored radio channel quality is met. In the illustrated example, this condition is assumed to be met when the radio channel quality monitored at step 350 meets a certain quality level, e.g., defined in terms of a minimum threshold for the RSSI. Further, when using the option of starting the timer at step 350, the condition may be met when the timer expires, irrespective of the monitored channel conditions. It is noted that also in this case other definitions of the condition to be met are possible, e.g., conditions considering further criteria such as mobility of the UE.

If at step 360 it is found that the monitored radio channel conditions meet the specified quality level, the procedure continues with step 370 as indicated by branch "Quality level met". At step 370, the UE initiates a random access procedure and enters connected mode so that downlink data (e.g. user plane data) can be transferred from the network to the UE and/or uplink data can be transferred from the UE to the network. Similarly, if the timer expires, the procedure continues with step 380, as indicated by branch "Timer expired". At step 380, the UE initiates a random access procedure and enters connected mode so that downlink data (e.g. user plane data) can be transferred from the network to the UE and/or uplink data (e.g. user plane data) can be transferred from the UE to the network.

If at step 340 it is found that the radio channel quality is sufficient, e.g., above a threshold, the procedure continues to step 390, as indicated by branch "Yes". At step 390, the UE stays in connected mode so that downlink data (e.g. user plane data) can be transferred from the network to the UE and/or uplink data (e.g. user plane data) can be transferred from the UE to the network.

As can be seen, also the procedures of FIG. 3 allow for increasing the chances of triggering the data transfer to or from the UE when the radio channel conditions are favorable, because in the case of unfavorable conditions the UE is caused to temporarily change back to idle mode.

Figure 4:
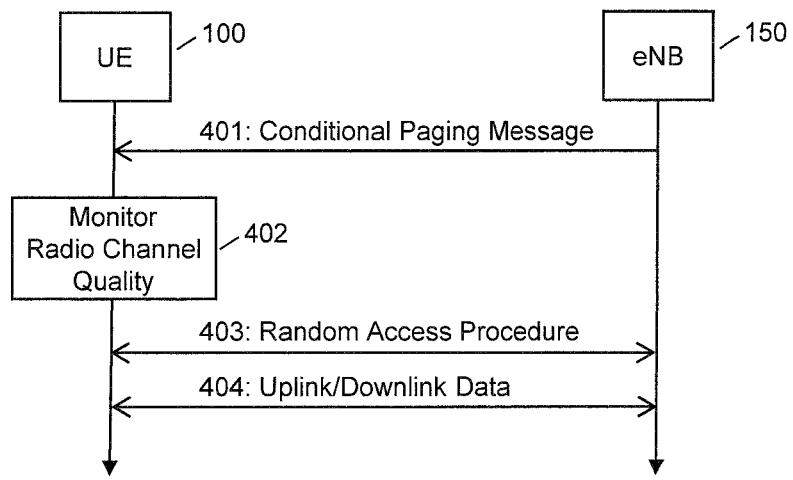
FIGS. 4 to 6 illustrate examples of processes according to an embodiment of the invention.

FIG. 4 shows an example of processes based on the procedures of FIG. 2. The processes of FIG. 4 involve a UE (assumed to correspond to the MTC device 100) and a base station (assumed to correspond to the eNB 150).

As illustrated, the eNB 150 sends a conditional paging message 401 to the UE 100. The conditional paging message may be identifiable as being of the conditional type (i.e., distinguishable from other types of paging message) by including a corresponding indication (e.g., in terms of one or more indicator bits) or by being transmitted on a corresponding paging channel, e.g., the above-mentioned C-PCH.

In response to receiving the paging message 401, the UE 100 monitors the radio channel quality experienced by the UE 100. When the radio channel quality meets a specified quality level, the UE 100 performs a random access procedure as indicated by signals 403. Then, the UE 100 may receive downlink data and/or send uplink data, as indicated by 404.

Figure 5:
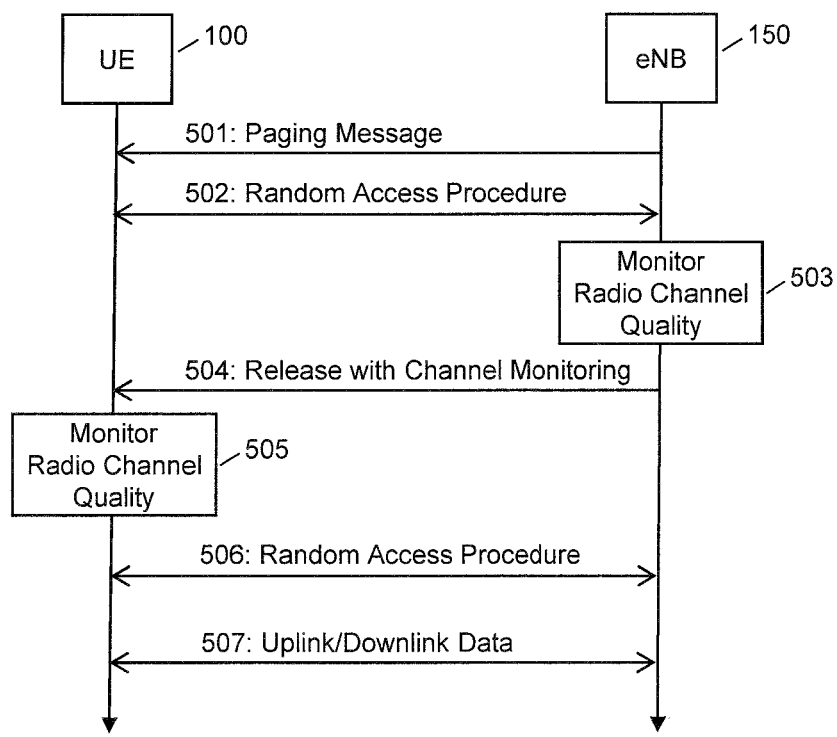

FIG. 5 shows an example of processes based on the procedures of FIG. 3. The processes of FIG. 5 involve a UE (assumed to correspond to the MTC device 100) and a base station (assumed to correspond to the eNB 150).

As illustrated, the eNB 150 sends a paging message 501 to the UE 100, e.g., the above-mentioned legacy paging message.

In response to receiving the paging message 501, the UE 100 performs a random access procedure as indicated by signals 502 and enters connected mode. The eNB 150 then monitors the radio channel quality experienced by the UE 100. In the example of FIG. 5, it is assumed that the eNB 150 finds that the radio channel quality is insufficient and thus sends a Release with Channel Monitoring message 504 to the UE 100.

In response to receiving the Release with Channel Monitoring message 504, the UE 100 monitors the radio channel quality experienced by the UE 100. When the radio channel quality meets a specified quality level, the UE 100 performs a random access procedure as indicated by signals 506. Then, the UE 100 may receive downlink data and/or send uplink data, as indicated by 507.

The above procedures are highly efficient in scenarios where UE is regularly monitoring the paging channel(s). This is also the case when the UE uses normal or extended DRX (Discontinuous Reception) and monitors the paging channel(s) at certain paging occasions.

In some scenarios, the UE may also use a power saving mode (PSM) where the UE is not regularly monitoring the paging channel(s). Rather, the UE may indicate its current location by a location update procedure, such as a TAU as defined in the LTE technology. A TAU is typically initiated when the UE detects that a corresponding trigger even is met (such as expiry of a corresponding timer having a duration of for example 30 minutes). for a short period of time during the TAU procedure, in particular after the UE sent a TAU message to the cellular network, the network can send downlink initiated traffic to the UE, before the UE will revert back to PSM. The above-mentioned concepts of conditionally triggering a data transfer are also applicable to this case. In particular, the trigger event may in this case correspond to the UE detecting that a trigger conditions for the location is met, and the above-mentioned condition may then be applied to control when to send the location update message (e.g., TAU message). Accordingly, if the condition is met, the UE will send the location update message. Upon registering to a cell a UE may be notified if this flexible location update procedure is allowed for the UE or not, e.g., by means of RRC configuration.

In the above procedures, the desired quality level, a possible hysteresis and the timer value may be defined in various ways. For example, such parameters could be pre-configured in the UE and/or base station (e.g., based on standard requirements). Further, these parameters may be indicated by the network to the UE, e.g., upon registering to a cell for the first time. By way of example, one or more RRC messages may be used for this purpose. The timer value could be defined in absolute time (e.g. seconds) or in terms of a number of paging occasions.

In some scenarios, it may be considered that certain radio devices are typically be stationary and constantly located in bad coverage areas. Such radio devices would seldom benefit from the above procedures. Accordingly, such stationary status of the radio device may be taken into account by allowing a UE to indicate whether it is stationary or not. In the former case, the above-described conditionality of triggering the data transfer may be overridden (which may also be regarded as a further criterion in the above-mentioned condition). In addition or as an alternative to the mobility indication from the UE, a self-learning function could be implemented in the network to track which radio devices are stationary and which are not.

Figure 7:
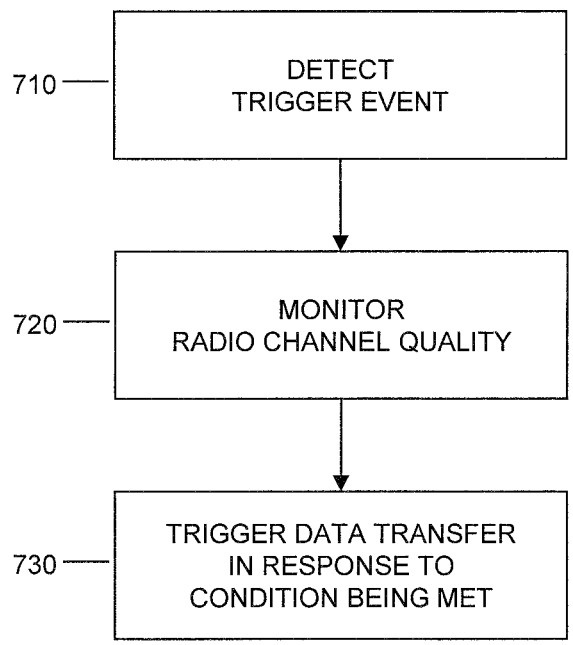
FIG. 7 shows a flowchart for illustrating a method according to an embodiment of the invention, which may be implemented by a radio device.

FIG. 7 shows a flowchart illustrating a method of controlling radio transmissions in a cellular network, by which a radio device, e.g., the above-mentioned MTC device 100, may implement concepts as described above. If a processor based implementation of the radio device is utilized, at least a part of the steps of the method may be performed and/or controlled by one or more processors of the radio device.

Figure 6:
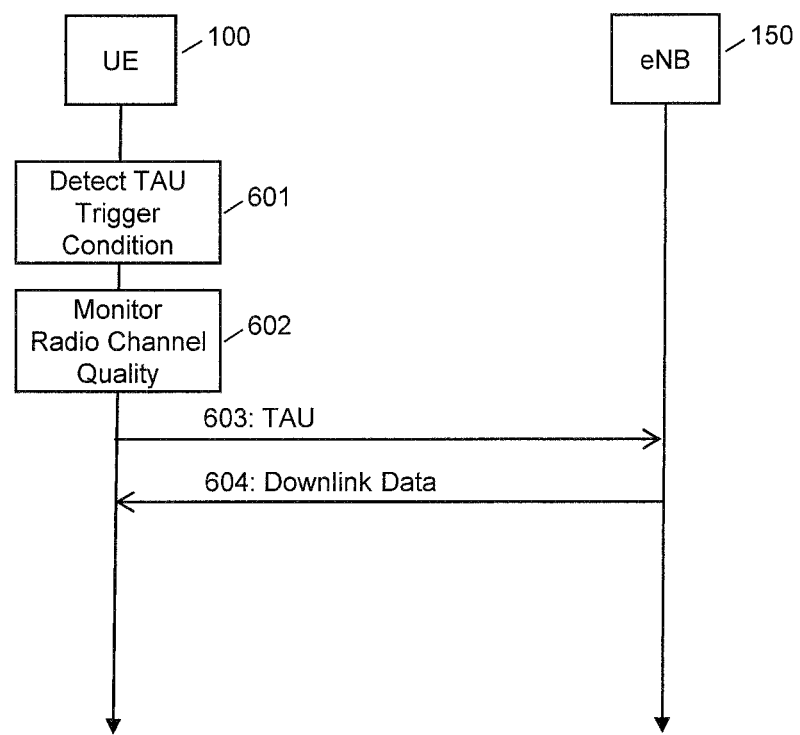

At step 710, the radio device detects a trigger event. The trigger event may involve reception of a paging message, such as one of the above-mentioned paging messages 401, 501. Further, the trigger event may involve that the radio device detects a trigger condition for a location update of the radio device, e.g., a TAU as explained in connection with the example of FIG. 6. Such trigger condition may for example be based on expiry of a location update timer.

At step 720, the radio device monitors radio channel quality experienced by the radio device. This is accomplished in response to the trigger event detected at step 710. For monitoring the radio channel quality, the radio device may monitor signals from one or more base stations of the cellular network. The radio channel quality may for example be determined in terms of an RSSI.

At step 730, the radio device triggers a data transfer with the cellular network. This is accomplished in response to a condition based on the monitored radio channel quality being met. The data transfer may include a downlink data transmission from the cellular network to the radio device and/or an uplink radio transmission from the radio device to the cellular network. Triggering the data transfer may involve at least temporarily establishing a connection to the cellular network, e.g., by performing a random access procedure to transition from idle mode to connected mode. The data transfer may be initiated by the cellular network. For example, the cellular network may initiate the data transfer by sending the paging message mentioned in connection with step 710. Further, the cellular network may initiate the data transfer by sending downlink data at the occasion of the location update mentioned in connection with step 710. Accordingly, while the data transfer may be initiated by the cellular network, the execution of the data transfer (in particular the time of executing the data transfer) further depends on the monitoring of the radio channel quality by the radio device.

If the trigger event involved reception of a paging message, the radio device may receive an indication which causes the radio device to perform said monitoring of the radio channel quality in response to reception of the paging message. Such indication may be transmitted with the paging message itself, e.g., be provided by using a corresponding type of paging message, as described above for the paging message 401 of the conditional type. The type of paging message may be identifiable by one or more indicator bits in the paging message and/or by a channel used for transmission of the paging message, such as the above-mentioned C-PCH. Alternatively, the indication could be transmitted separately from the paging message.

In some scenarios, the paging message may cause the radio device to establish a connection to the cellular network, and the indication may be provided in a message which causes the radio device to release the established connection, e.g., as explained in connection with the paging message 501 of FIG. 3, where the indication is provided in the Release with Channel Monitoring message 504.

If the trigger event detected at step 710 is based on a trigger condition for a location update of the radio device, the radio device may trigger the data transfer by sending a location update message to the cellular network, such as the above-mentioned TAU message.

In some scenarios, the condition may further be based on expiry of a timer started by the radio device when detecting the trigger event. In particular, such timer may be used to trigger the data transfer irrespective of the monitored radio channel quality.

Figure 8:
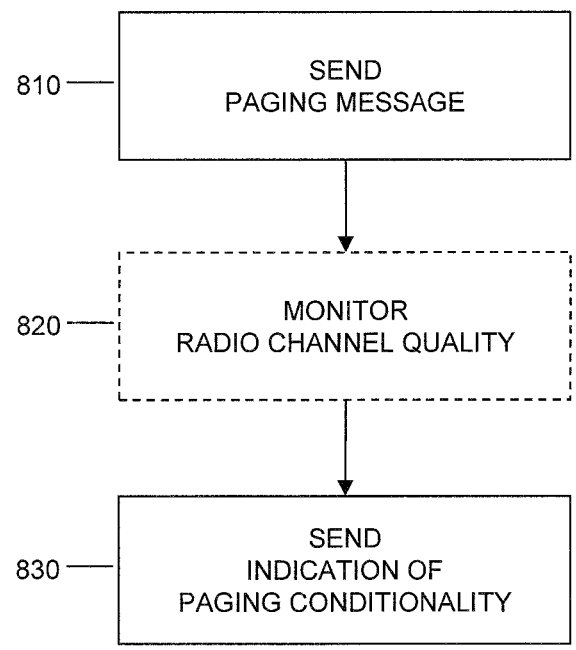
FIG. 8 shows a flowchart for illustrating a further method according to an embodiment of the invention, which may be implemented by a base station.

FIG. 8 shows a flowchart illustrating a method of controlling radio transmissions in a cellular network, by which a base station, e.g., an eNB such as the above-mentioned eNB 150, may implement concepts as described above. If a processor based implementation of the base station is utilized, at least a part of the steps of the method may be performed and/or controlled by one or more processors of the base station.

At step 810, the base station sends a paging message to a radio device, such as the above-mentioned MTC device 100. The paging message may for example correspond to one of the above-mentioned paging messages 401, 501.

In some scenarios, the radio device may monitor radio channel quality experienced by the radio device, as illustrated by optional step 820. Specifically, the paging message of step 810 may cause the radio device to establish a connection to the cellular network, and the base station may then monitor the radio channel quality experienced in communication between the base station and the radio device. The paging message may have the purpose of initiating a data transfer between the radio device and the cellular network. An example of corresponding procedures was explained in connection with steps 330 and 340 of FIG. 3.

At step 830, the base station sends an indication to the radio device. The indication causes the radio device to react to reception of the paging message by monitoring radio channel quality experienced by the radio device and trigger a data transfer with the cellular network in response to a condition based on the monitored radio channel quality being met. Accordingly, while the paging message may initiate the data transfer, the execution of the data transfer (in particular the time of executing the data transfer) further depends on the monitoring of the radio channel quality by the radio device.

The indication of step 830 may be transmitted with the paging message itself, e.g., be provided by using a corresponding type of paging message, as described above for the paging message 401 of the conditional type. The type of paging message may be identifiable by one or more indicator bits in the paging message and/or by a channel used for transmission of the paging message, such as the above-mentioned C-PCH. Alternatively, the indication could be transmitted separately from the paging message.

In some scenarios, the paging message may cause the radio device to establish a connection to the cellular network, and the indication may be provided in a message which causes the radio device to release the established connection, e.g., as explained in connection with the paging message 501 of FIG. 3, where the indication is provided in the Release with Channel Monitoring message 504. The base station may send the message causing the radio device to release the established connection depending on the radio channel quality optionally monitored at step 820. For example, the base station may send the message when the monitored radio channel quality is below a threshold.

It is to be understood that the methods of FIGS. 7 and 8 may also be combined in a system including a base station operating according to the method of FIG. 8 and at least one radio device operating according to the method of FIG. 7.

Figure 9:
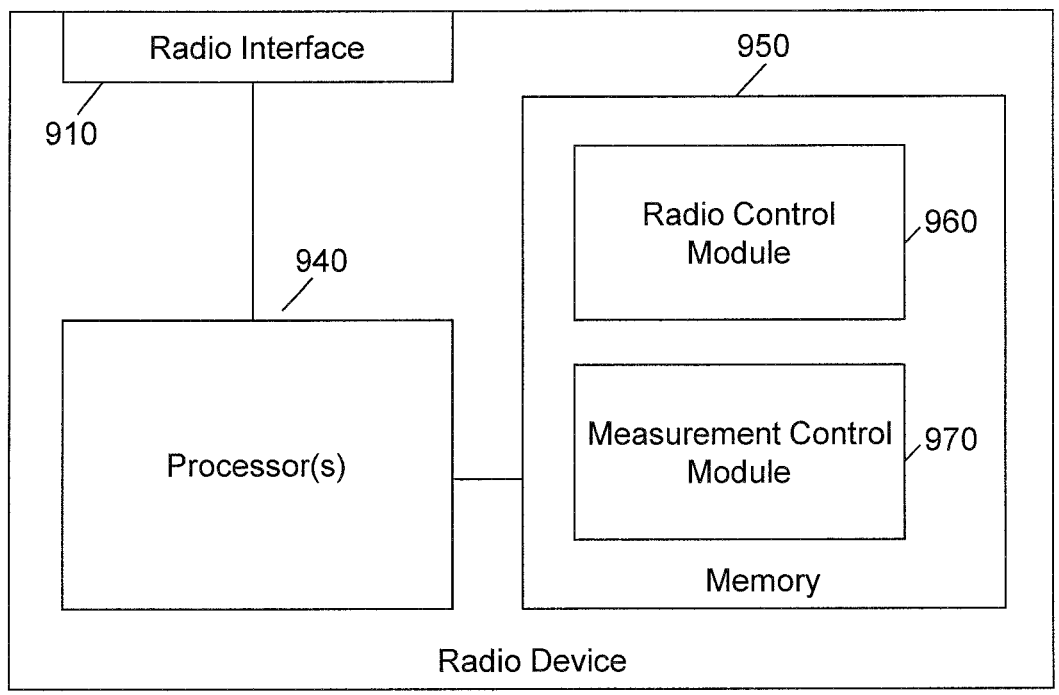
FIG. 9 schematically illustrates a processor-based implementation of a radio device according to an embodiment of the invention.

FIG. 9 shows a block diagram for schematically illustrating a processor based implementation of a radio device which may be utilized for implementing the above concepts. The radio device may for example correspond to an MTC device, in particular an NB-IoT radio device, such as the MTC device 100 of FIG. 1.

As illustrated, the radio device includes a radio interface 910. The radio device may utilize the radio interface 910 for connecting to a cellular network, e.g., through a base station of the cellular network, such as the eNB 150.

Further, the radio device is provided with one or more processors 940 and a memory 950. The radio interface 910, and the memory 950 are coupled to the processor(s) 940, e.g., using one or more internal bus systems of the radio device.

The memory 950 includes program code modules 960, 970 with program code to be executed by the processor(s) 940. In the illustrated example, these program code modules include a radio control module 960 and a measurement control module 970.

The radio control module 960 may implement the above-described functionalities of triggering and/or performing a data transfer, receiving paging messages, receiving the indication to perform the monitoring of radio channel quality, and establishing or releasing a connection to the cellular network. The measurement control module 970 may implement the above-described functionalities of monitoring radio channel quality.

It is to be understood that the structures as illustrated in FIG. 9 are merely exemplary and that the radio device may also include other elements which have not been illustrated, e.g., structures or program code modules for implementing known functionalities of a NB-IoT radio device or other type of UE.

Figure 10:
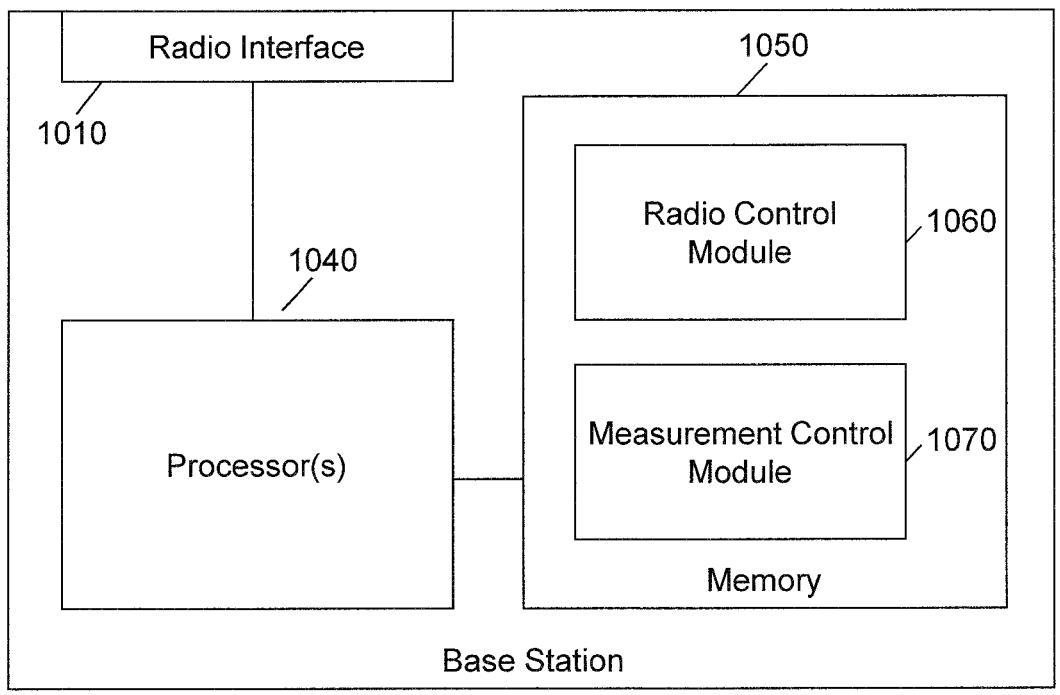
FIG. 10 schematically illustrates a processor-based implementation of a base station according to an embodiment of the invention.

FIG. 10 shows a block diagram for schematically illustrating a processor based implementation of a base station which may be utilized for implementing the above concepts. The base station may for example correspond to an eNB, such as the eNB 150 of FIG. 1.

As illustrated, the base station includes a radio interface 1010. The base station may utilize the radio interface 1010 for connecting to at least one radio device, e.g., an NB-IoT radio device such as the UE 100.

Further, the base station is provided with one or more processors 1040 and a memory 1050. The radio interface 1010, and the memory 1050 are coupled to the processor(s) 1040, e.g., using one or more internal bus systems of the base station.

The memory 1050 includes program code modules 1060, 1070 with program code to be executed by the processor(s) 1040. In the illustrated example, these program code modules include a radio control module 1060 and a measurement control module 1080.

The radio control module 1060 may implement the above-described functionalities of performing a data transfer, sending paging messages, sending the indication to perform the monitoring of radio channel quality, and establishing or releasing a connection to the radio device. The measurement control module 1070 may implement the above-described functionalities of monitoring radio channel quality.

It is to be understood that the structures as illustrated in FIG. 10 are merely exemplary and that the base station may also include other elements which have not been illustrated, e.g., structures or program code modules for implementing known functionalities of a eNB or other type of base station.

It is to be understood that the concepts as explained above are susceptible to various modifications. For example, the concepts could be applied in connection with various kinds of radio technologies and radio devices, without limitation to MTC radio devices, NB-IoT radio devices, or the LTE radio technology. Further, it is to be understood that the illustrated concepts may also be combined with other conditions for triggering connection establishment after receiving a paging message.

The invention claimed is:

1. A method of controlling radio transmission in a cellular network, the method comprising:
   a radio device detecting a trigger event;
   in response to the trigger event, the radio device monitoring radio channel quality experienced by the radio device; and
   in response to a condition based on the monitored radio channel quality being met, the radio device triggering a data transfer with the cellular network,
   wherein the trigger event includes reception of a paging message, and
   wherein the radio device further receiving an indication that causes the radio device to perform the monitoring of the radio channel quality in response to reception of the paging message, which is a dedicated paging message of conditional type.

2. The method according to claim 1,
   wherein the indication is transmitted with the paging message.

3. The method according to claim 1,
   wherein the paging message causes the radio device to establish a connection to the cellular network; and
   wherein the indication comprises a message causing the radio device to release the connection.

4. The method according to claim 1,
   wherein the trigger event comprises a trigger condition for a location update of the radio device; and
   wherein the radio device triggers the data transfer communication by sending a location update message to the cellular network.

5. The method according to claim 1,
   wherein the condition is further met based on expiry of a timer started by the radio device upon detecting the trigger event.

6. A method of controlling radio transmission in a cellular network, the method comprising:
   a base station of the cellular network sending a paging message to a radio device; and
   the base station sending an indication to the radio device, the indication causing the radio device to, in response to reception of the paging message, monitor radio channel quality experienced by the radio device and trigger a data transfer with the cellular network in response to a condition based on the monitored radio channel quality being met,
   wherein the paging message is a dedicated paging message of conditional type.

7. The method according to claim 6,
   wherein the indication is transmitted with the paging message.

8. The method according to claim 6,
   wherein the paging message causes the radio device to establish a connection to the cellular network; and
   wherein the indication comprises a message causing the radio device to release the connection.

9. The method according to claim 8, comprising:
   the base station monitoring radio channel quality experienced in communication between the base station and radio device; and
   the base station sending the indication depending on the radio channel quality monitored by the base station.

10. The method according to claim 6,
    wherein the condition is further met based on expiry of a timer started by the radio device upon detecting the trigger event.

11. A radio device, comprising:
    a radio interface for connecting to a cellular network; and
    one or more processors configured to:
      detect a trigger event;
      in response to the trigger event, monitor radio channel quality experienced by the radio device; and
      in response to a condition based on the monitored radio channel quality being met, trigger a data transfer with the cellular network,
      wherein the trigger event includes reception of a paging message, and
      wherein the radio device further receives an indication that causes the radio device to perform the monitoring of the radio channel quality in response to reception of the paging message, which is a dedicated paging message of conditional type.

12. A base station for a cellular network, the base station comprising:
    a radio interface to a radio device; and
    one or more processors configured to:
      send a paging message to the radio device; and
      send an indication to the radio device, the indication causing the radio device to, in response to reception of the paging message, monitor radio channel quality experienced by the radio device and trigger a data transfer with the cellular network in response to a condition based on the monitored radio channel quality being met,
    wherein the paging message is a dedicated paging message of conditional type.

* * * * *